March 1, 1955  H. LOWENTHAL  2,703,037
FOUR ELEMENT TELEPHOTO LENS SYSTEM
Filed May 15, 1952
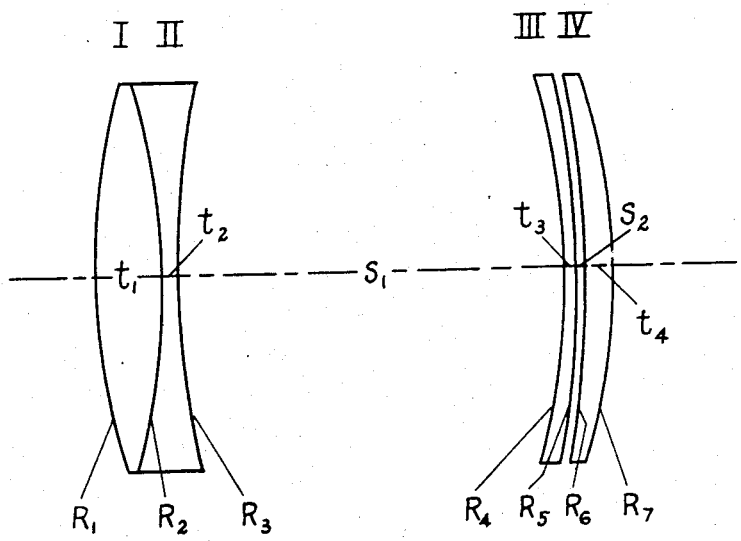
Inventor:
Herman Lowenthal
By Zabel, Baker, York, Jones & Dithmar
Attorneys.

United States Patent Office 2,703,037
Patented Mar. 1, 1955

2,703,037

FOUR ELEMENT TELEPHOTO LENS SYSTEM

Herman Lowenthal, Chicago, Ill., assignor to General Scientific Corporation, Chicago, Ill., a corporation of Illinois Application May 15, 1952, Serial No. 287,958

1 Claim. (Cl. 88—57)

My invention relates to a telephoto lens system, and particularly to a telephoto objective for use with moving picture cameras. While the invention disclosed herein may be used generally for telephoto objectives in various types of cameras, it is particularly adapted for use with professional type moving picture cameras.

It is well known that telephoto objectives are used on cameras which normally are equipped with conventional objectives having a comparatively short focal length. Thus the overall length of a conventional objective is made sufficiently small to render the camera readily usable.

A telephoto objective comprises a positive lens group and negative lens group separated by a distance from each other. Such an objective has a focal length substantially longer than the distance from the front vertex to the image plane. As a rule, full correction for a telephoto objective is more difficult to achieve than for a conventional objective. In addition to correction, a telephoto objective must have better than average resolution. It is well known that the over-all resolving power of an objective frequently occurs at an aperture smaller than maximum. This has been determined to be due to uncorrected spherical aberration and coma.

In theory, the resolving power of an objective is a function of the objective aperture, or an inverse function of the focal length. Thus, as the focal length of the objective increases, other lens characteristics, as corrections for example, remaining the same, the resolving power of the objective decreases.

A telephoto objective for moving picture camera work obviously requires a high standard of resolution and thus makes it increasingly necessary to provide excellent correction. Thus spherical aberration, sine condition, coma, astigmatism, and field curvature, as well as chromatic aberrations, all have to be taken into account and excellently corrected. For moving picture cameras, telephoto objectives having focal lengths of six inches up to ten inches are frequently used. The objective forming the subject matter of this invention is designed for such focal lengths.

The objective to be hereinafter described is conventional in having a front lens group which is predominantly positive and a rear lens group which is predominantly negative, the two groups being separated by a substantial distance. A novel feature of the invention, however, resides in the fact that the two lens groups are spaced apart by a distance which is about one-third of the focal length of the objective, the range being from about .30 to about .35.

The entire objective consists of four lens elements, the first being the front lens nearest to the object. One important feature of the invention resides in the fact that lens elements I and III are made of one type of glass while lens elements II and IV are made of a different type of glass. The indices of refraction for the D line of the two types differ by about 0.15, as will be seen.

A further important feature of the invention resides in the fact that the positive front group of the objective has a power substantially equal to the absolute value of the power of the negative rear group. Thus the algebraic sum of the powers of the front and rear groups is substantially equal to zero. This makes it easier to correct against higher order positive and negative aberrations.

The Petzval condition requires that the product of the refractive index and focal length of one lens or lens group plus the corresponding product for the other lens group be equal to zero. Since the power of a lens is the reciprocal of the focal length, it will be seen that an objective having the two powers of the front and rear groups substantially equal but opposite in sign, makes for excellent correction of curvature of field. The substantial distance separating the front and rear lens groups improves the characteristics of the entire objective with regard to correction for spherical aberration.

Thus an objective embodying my invention, having a focal length of ten inches for use on a 35 mm. moving picture camera, has a half angle field of about 3°. The objective may be used to cover a half angle field of about 12° if tangential and sagittal field curvature of no more than ⅓ of 1% is tolerated. Under such conditions the astigmatic differences are less than ⅙ of 1%. Within the 3° half field range, the curvature of field is less than ⅒ of 1% of the focal length. The spherical aberration for the objective is about ⅕ of 1% of the focal length while coma and chromatic aberrations are negligible. The boundary of a 12° half field has a distortion of less than 3% of the focal length.

The single figure in the accompanying drawing illustrates a telephoto objective embodying my invention. The reference numerals and letters thereon are conventional.

The design data for a specific example of an objective embodying my invention is set forth below. As is usual, it will be assumed that light travels from left to right and that radii will be positive or negative if the center of curvature is respectively to the right or left of the lens surface. The quantity $N_D$ is the index of refraction for the D sodium line while V is the dispersion number.

Thus referring to the figure, lens I is a positive element while lens II is a negative element, the two being cemented together as shown to form a predominantly positive component lens group.

Lens elements III and IV are each a miniscus separated by a small air space and form a predominantly negative component lens group. The two groups are spaced from each other an axial distance of about ⅓ of the focal length of the entire objective. As has been indicated above, elements I and III are made of one type of glass while elements II and IV are made of a different type of glass, the two glasses having the characteristics given in the table following. The glasses are so designed that the power of the first component lens group is algebraically opposite and substantially equal to the power of the second component lens group. Thus the combination of glass characteristics and powers reduces the Petzval sum to substantially zero, this being the well-known condition for a substantially flat image field.

In the objective as illustrated in the drawing, the diaphragm (not shown) may be located substantially half way between the second and third elements.

In connection with the drawing, the following example is illustrative of an objective embodying the present invention.

[Focal length=100; Back focal distance=37.4; Aperture=F:4.5]

| Lens | $N_D$ | V | Radii | Axial Distances |
|---|---|---|---|---|
| I | 1.541 | 59.8 | $R_1=+\ 24.21$ | $t_1=\ 5.5$ |
| II | 1.689 | 30.9 | $R_2=-\ 46.30$ | $t_2=\ 1.5$ |
|   |   |   | $R_3=+182.75$ | $s_1=32.6$ |
| III | 1.541 | 59.8 | $R_4=-\ 14.16$ | $t_3=\ 1.5$ |
|   |   |   | $R_5=-\ 95.01$ | $s_2=\ 0.9$ |
| IV | 1.689 | 30.9 | $R_6=-124.20$ | $t_4=\ 2.5$ |
|   |   |   | $R_7=-\ 30.37$ |   |

The back focal distance, being the distance between the image plane and the rear vertex of the system, plus the overall distance between the front and rear vertices of the objective may be considered as the total length of the system, and this amounts to about 0.8 times the focal length. The total length of the new objective is substantially shorter than the total length of prior telephoto objectives of comparable speed. My new telephoto objective, having a substantial length in relation to conventional photographic objectives, makes it possible to more nearly approach the quality of the latter. Thus higher speeds and greater angles of view are realized.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

A fully corrected telephoto objective having a high degree of resolution and good correction for chromatic aberration, field curvature, spherical aberration, coma, astigmatism and sine condition, having substantially the following characteristics where R is the radius of the surface indicated going from front to rear of the objective, $t$ is axial thickness of the lens, $s$ is axial separation of adjacent lenses, $N_D$ is the index of refraction and V is the dispersion number:

[Focal length=100; Back focal distance=37.4; Aperture=F:4.5]

| Lens | $N_D$ | V | Radii | Axial Distances |
|---|---|---|---|---|
| I | 1.541 | 59.8 | $R_1=+\ 24.21$ | $t_1=\ 5.5$ |
| | | | $R_2=-\ 46.30$ | |
| II | 1.689 | 30.9 | | $t_2=\ 1.5$ |
| | | | $R_3=+182.75$ | |
| | | | | $s_1=32.6$ |
| | | | $R_4=-\ 14.16$ | |
| III | 1.541 | 59.8 | | $t_3=\ 1.5$ |
| | | | $R_5=-\ 95.01$ | |
| | | | | $s_2=\ 0.9$ |
| | | | $R_6=-124.20$ | |
| IV | 1.689 | 30.9 | | $t_4=\ 2.5$ |
| | | | $R_7=-\ 30.37$ | |

References Cited in the file of this patent

UNITED STATES PATENTS

| | | |
|---|---|---|
| 1,467,804 | Merte | Sept. 11, 1923 |
| 1,485,515 | Merte | Mar. 4, 1924 |
| 1,573,999 | Richter | Feb. 23, 1926 |
| 1,897,896 | Frederick et al. | Feb. 14, 1933 |
| 2,239,538 | Richter | Apr. 22, 1941 |
| 2,354,503 | Cox | July 25, 1944 |
| 2,543,354 | Cook | Feb. 27, 1951 |